Figure 1:
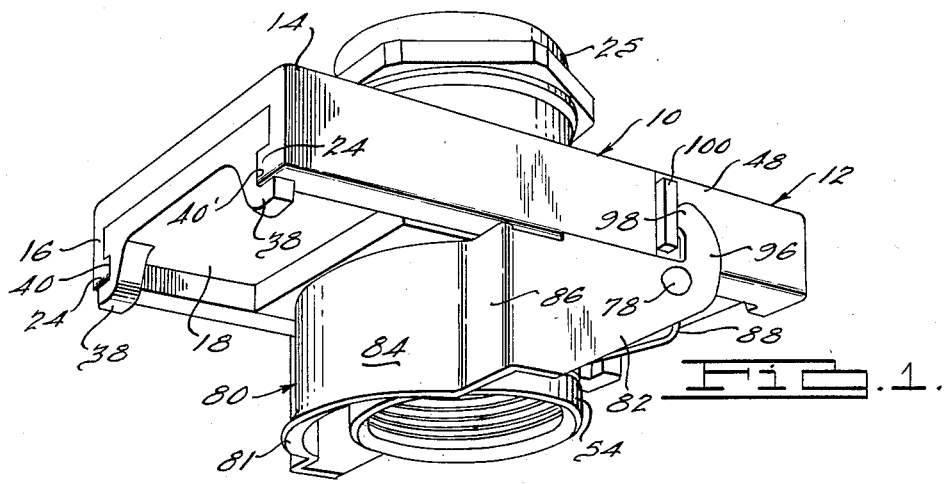

Aug. 7, 1956 S. H. ZEEB 2,757,941
COUPLING WITH SLIDING SEAL AND LOCKING DEVICE
Filed June 6, 1952 2 Sheets-Sheet 1

INVENTOR.
Stanley H. Zeeb.
BY
ATTORNEY

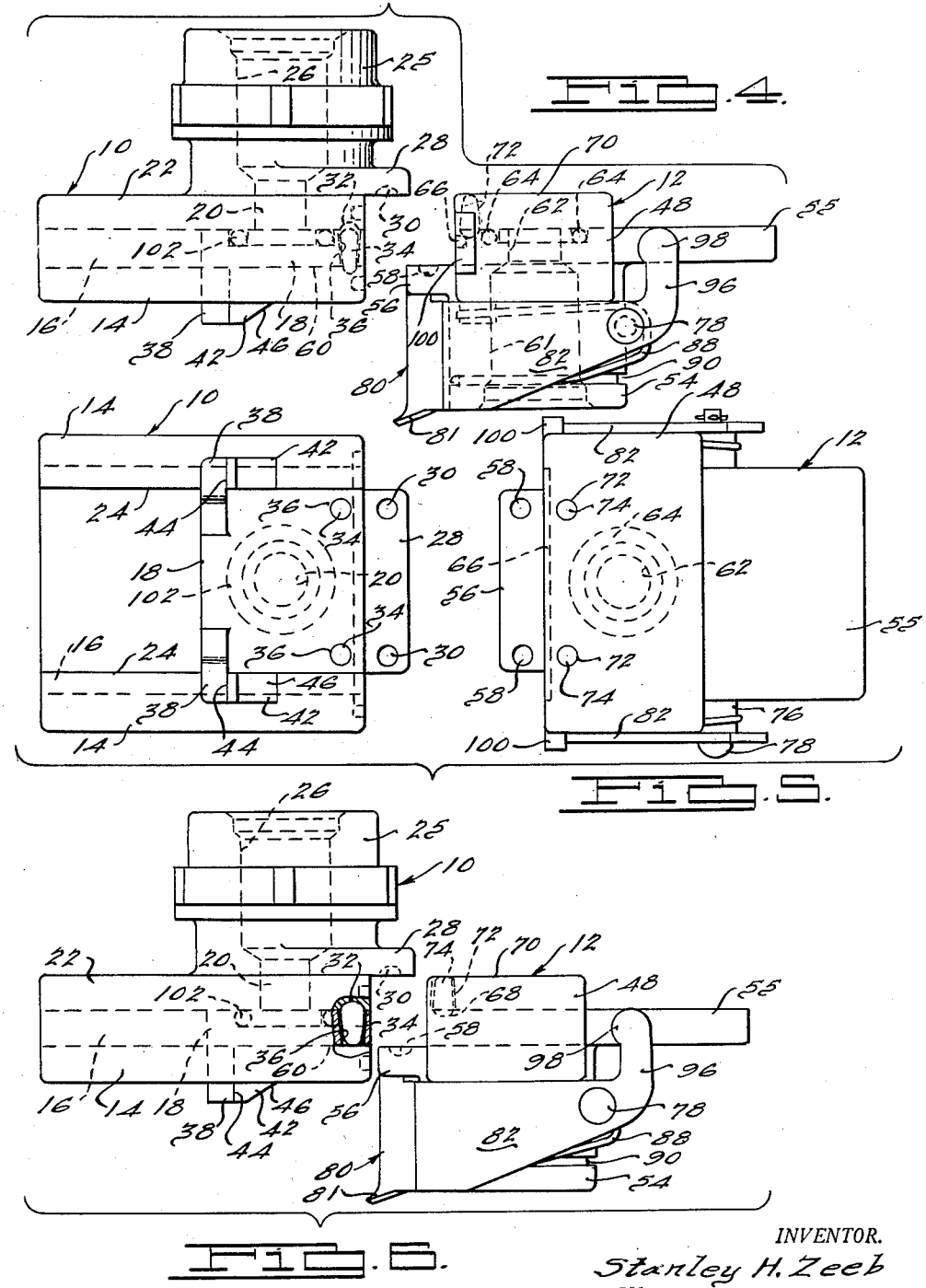

United States Patent Office 2,757,941
Patented Aug. 7, 1956

2,757,941

COUPLING WITH SLIDING SEAL AND LOCKING DEVICE

Stanley H. Zeeb, Jackson, Mich., assignor to Aeroquip Corporation, Jackson, Mich., a corporation of Michigan Application June 6, 1952, Serial No. 292,054

1 Claim. (Cl. 284—4)

This invention relates to couplings for connecting fluid conductor pipes or the like and more particularly to couplings of the sliding plate type in which the connection and disconnection of a pair of companion coupling body parts is effected by a rectilinear pushing together and pulling apart of the body parts, respectively, and is attended by a relative sliding of flat plate surfaces on the body parts to control the opening and closing of fluid transfer ports, which surfaces include cooperating fluid sealing means for maintaining a fluid seal around the registered ports at the joint between the connected coupling body parts.

In connection with these sliding plate and port sealed couplings the difficulty has been encountered that the sealing means employed tend to stick during the flow of fluid through the connected coupling body parts, which fluid flow tends to remove the lubricant initially provided for the sealing means, such sealing means being normally in the form of an O ring fitted into an annular recess in one of the plate surfaces. With the sealing means sticking, or "freezing-up" as it is sometimes described, additional resistance is offered to the manual disconnection of the coupling body parts, rendering it difficult to disconnect the parts due to the fact that the stuck sealing means must first be unstuck before the coupling body parts can be pulled apart.

It is an important object of the present invention to provide an improved coupling construction of the above described kind in which the disconnection of the coupling body parts is attended with the application of an initial force to the sliding plate parts, which force is effective to overcome any resistance offered to the pulling apart of the coupling body parts, due to sticking of the sealing means, so that the manually actuated means employed to free the said parts for separation can be readily actuated for such purpose.

A further object of the invention is to provide a coupling construction of the above described kind in which sticking of the sealing means is overcome upon actuation of the manually operated release means employed to free the coupling body parts for disconnection.

The above and further objects and advantages of the invention, residing in the construction, arrangement and combination of parts will become clear from a consideration of the following detail description of one practical form of the invention, by way of example, with reference to the accompanying drawings and from the appended claim.

Figure 2:
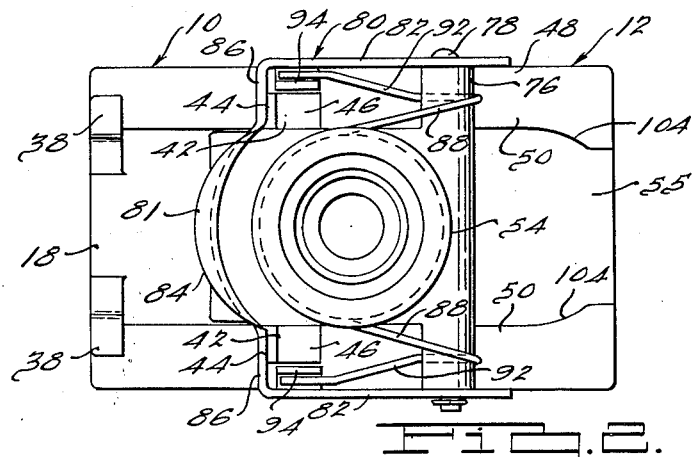
Figure 3:
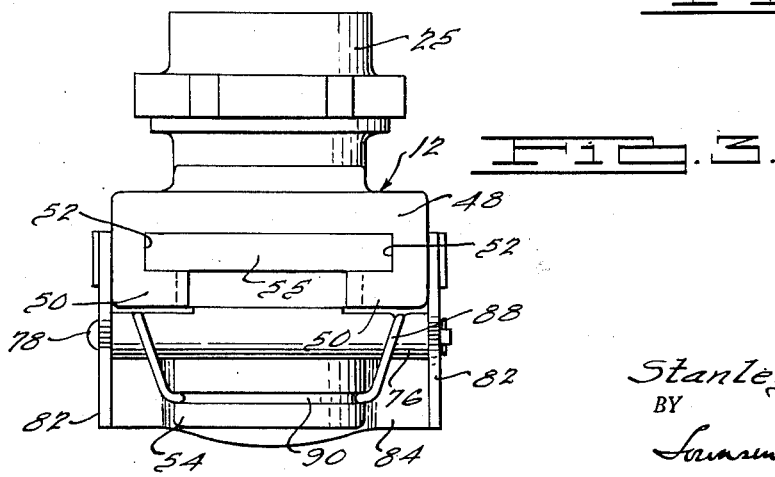

In the drawings:

Fig. 1 is a perspective view of a coupling assembly in accordance with the invention, showing the two coupling body parts coupled together, Fig. 2 is an underneath plan view of the coupling body parts as seen in Fig. 1, Fig. 3 is a view looking on the right-hand end of Fig. 1, Fig. 4 is a side elevation of Fig. 1 showing the coupling body parts disconnected, Fig. 5 is a plan view of the disconnected coupling body parts, the left-hand side of Fig. 5 being a bottom plan view of the left-hand half of Fig. 4 and the right-hand half of Fig. 5 being a top plan view of the right-hand half of Fig. 4, and Fig. 6 is a view similar to Fig. 4 but diagrammatic in character and intended to illustrate more clearly the operation involved in connecting and dis-connecting the two coupling body parts.

Referring to the drawings, 10 and 12 indicate, generally the two coupling body parts.

The body part 10 comprises an outer rectangular part 14 formed with a female guideway 16 on its underneath surface, in which a valve slide plate 18 is slidably mounted with respect to a port 20 in the otherwise closed top wall 22 of the body part 10, which body part is of channel section and presents inturned side flanges 24 (Figs. 1 and 5) at the bottom, defining the guideway 16. Rigid with the top wall 22 is a tubular boss 25, the enlarged bore 26 of which is in communication with the port 20 and may be screw-threaded for the connection of this body part to a fluid conductor, such as a tube section (not shown). Also rigid with the top wall 22, and extending from one end thereof, there is a tongue portion 28 (Figs. 4, 5 and 6) formed in its underneath surface with a pair of laterally spaced circular depressions 30, the purpose of which will be described later. Similar depressions 32 are provided in the underneath surface of the wall 22 at the end thereof (referred to hereafter as the "inner end") adjacent the tongue 28. A pair of spherical ended pin elements 34 are mounted in laterally spaced holes 36 extending through the valve slide plate 18, which plate, at the end thereof (referred to hereafter as the "outer end") remote from the tongue 28 is formed, on its oppoiste sides, with outwardly projecting flange portions 38 (Fig. 1) which slidably engage beneath the guideway flanges 24 and define, with the plate 18, guide slots 40 in which the guideway flanges engage. These flanges 24, on their underneath surface, are formed with downwardly projecting lugs 42, presenting on their outer ends, vertical walls 44 and, on their inner ends, inclined ramp surfaces 46 of about 30° inclination.

Turning now to the body part 12, this comprises an outer rectangular body part 48, also of channel section, and having bottom inturned flanges 50 (Fig. 3) defining a guideway 52 for the sliding engagement of this body part with respect to an elongated rectangular plate 55 providing, in an integral structure, a hollow boss 54 and a tongue portion 56 (Figs. 4, 5 and 6) having a pair of laterally spaced circular depressions 58 in its upper surface, as presented to the bottom surface 60 of the slide valve plate 18, it being appreciated that this reference to "top" and "bottom" and "underneath" has reference to the position of the parts as seen in the drawings.

The boss 54 has an enlarged internally screw-threaded bore 61, for the connection of this coupling body part 12 to another fluid conductor, such as a tube section (not shown), which bore 61 is in communication with a reduced port 62 (Fig. 4) in the plate 55, said port 62 being surrounded on the upper surface of the plate, with a sealing ring 64 set into an annular recess in the plate surface. At its inner end, as presented to the slide valve plate 18 on the opposed coupling body part 10, the plate 55 is formed with a laterally extending channel, in which a sealing strip 66 is mounted. Also provided in the upper surface of the plate 55, at the end thereof adjacent the tongue 56, are a pair of laterally spaced circular depressions 68 (Fig. 6), similar to the depressions 58 and to the aforesaid depression 30 and 32 on the other coupling body part. The top closed wall 70 of the body part 48 has a pair of laterally spaced holes 72 therethrough, corresponding with said depressions 68, in which holes a pair of spherical ended pins 74 are mounted.

The boss 54, on the side thereof remote from the tongue 56 and immediately beneath the sliding body part 48, is formed with a laterally extending elongated boss 76 (Figs. 2, 3 and 5), in which boss a hinge pin 78 is mounted, said hinge pin serving for the hinged mounting of a lever device, indicated generally at 80. This lever device is adapted to be hand actuated to free the coupling body parts 10 and 12 for disconnection from their coupled condition, as seen in Fig. 1, and to be automatically tripped upon coupling the body parts together, as will be clear from the following description.

The lever device 80 is of fork-like construction and comprises a pair of similar side limbs 82, which extend upon opposite sides of the boss 54, and a closed end 84 of substantially semi-cylindrical formation concentrically disposed with respect to the boss 54 and presenting angular portions 86 (Figs. 1 and 2) for location against the vertical sides 44 of the lugs 42 in the fully coupled condition of the coupling body parts. The lower edge portion 81 of the closed lever end 84 is bent outwards to form a finger grip to facilitate actuation of the lever to swing its closed end downwardly to free the angular portions from the lugs 42 when it is desired to uncouple the body parts. The lever device 80 is urged into the closed position, as seen in Fig. 1, by a bent spring strip 88 looped about an annular groove 90 in the boss 54 and about the hinge pin boss 76 (as seen clearly in Fig. 2) and having bent back ends 92 retained against inturned flange portions 94 on the side limbs 82. At their outer free ends, remote from the closed end 84, the limbs 82 are formed with vertical extensions 96 each formed with a nose 98 (Figs. 1, 4 and 6), which noses, in the coupled condition, engage against side lugs 100 on the body part 48 and are urged into engagement with the lugs 100 by the action of the spring 88.

In operation, and referring first to the uncoupled body parts 10 and 12, as seen in Figs. 4 and 6, in this condition of the parts the sliding body part 48 of the coupling part 12 is in position on the plate part 55 where it closes the port 62 in this plate part, whereas the slide plate 18 of the other coupling part 10 is in position on its body part 14 where it closes the port 20. Also in this condition of the parts (where the sealing ring 64 seals between the plate 55 and the body part 48, while another sealing ring 102 seals between the sliding plate 18 and the body part 14), the pins 74 on the sliding part 48 are engaged at their lower spherical ends in the depressions 68 in the plate 55, whereas the pins 34 on the sliding plate 18 are engaged at their upper spherical ends in the depressions 32 in the body part 14. It is convenient to point out here, and with particular reference to Fig. 6, that the pins 34 and 74 are in the form of taper pins, with the holes 36 and 72 being correspondingly tapered to permit the pins to be inserted into their respective holes from one end thereof and be retained against falling out of their holes once the parts 14 and 18 and 48 and 55 have been assembled. At the same time the pins (which are slightly longer than their holes) are free to move upwards and downwards in their holes to project one or the other of their opposite spherical ends beyond the holes for engagement in the depressions 30, 32, 58, 68, as will now be described.

To couple the parts 10 and 12, it is merely necessary to engage the tongue 56 against the underneath surface 60 of the slide plate 18 while at the same time the tongue 28 is fitted over the top surface of the part 48. This positions the depressions 58 over the lower ends of the pins 34 and the depressions 30 over the upper ends of the pins 74 and at the same time brings the opposed ends of the body parts 14 and 48 into abutment against one another, with the lugs 100 on the body part 48 abutting the adjacent end of the body part 14. With the parts thus engaged, pushing the coupling parts 10 and 12 in opposite directions will be accompanied by vertical movement of the pins 34 and 74, with the lower ends of the pins 34 being cammed downwardly into the depressions 58 and the upper ends of the pins 74 being cammed upwardly into the depressions 30. Accordingly, the slide part 48 of the coupling part 12 is keyed by the pins 74 to the body part 14 of the other coupling part 10, whereas the slide part 18 of the coupling part 10 is keyed by the pins 34 to the plate 55 of the coupling part 12.

This, therefore, results in the parts 14 and 48 being united by the pins 74 for movement as a unit relatively to the parts 55 and 18, said parts 55 and 18 being united by the pins 34. Continued pushing upon the coupling parts 10 and 12 in opposite directions will result in the slide part 18 being pushed to the left in the guideway 16 (to the position as seen in Fig. 1, in which the port 20 is open) at the same time as the body part 48 is pushed to the right on its guide plate 55 to open the port 62, as seen in Fig. 1. Simultaneously with such movements, the closed end 84 of the lever 82 will snap over the lugs 42 and position the lugs 100 against the end of the body part 14 with the noses 98 on the lever extensions 96 urged into engagement with the lugs 100 by the action of the spring 88. When the lever snaps over the lugs 42 the engagement of the lever angle parts 86 behind the vertical lug walls 44 locks the coupling parts 10 and 12 against separation, with the coupling operation completed and the ports 20 and 62 in fluid flow register with respect to the bores 26 and 61 in their respective bosses 24 and 54.

To uncouple the parts 10 and 12, the lever 80 is grasped at the finger grip portion 81 and is swung downwardly, from its closed end, about the pivot pin 78 to remove the upper end portion of the closed end of the lever from the path of the lugs 42. At the commencement of this swinging movement the noses 98 push (to the left as seen in Fig. 1) against the lugs 100 and apply a force to these lugs which has the effect of applying a a force to the parts 18 and 55, keyed together by the pins 34, and this relatively to parts 14 and 48, keyed together by the pins 74. This relative movement is relied upon to break any adherence which may exist between the sealing ring 64 and the body part 14. With the lever 80 disengaged from the lugs 42 the coupling parts 10 and 12 are free to be pulled apart. In so doing the slide part 18 is constrained, by the pins 34 (still engaged in the depressions 58) to move with the plate part 55 at the same time as the part 48 is constrained by the pins 74 (still engaged in the depressions 30) to move with the body part 14. Accordingly, as the coupling parts 10 and 12 are pulled apart the parts 18 and 48 are constrained to slide back into their positions as seen in Figs. 4 and 6, where they close their respective ports 20 and 62. When this position is reached, the lower ends of the pins 34 are pushed out of the depressions 58 and engaged at their upper ends in the depressions 32, while at the same time the upper ends of the pins 74 are disengaged from the depressions 30 and engaged at their lower ends in the depressions 68. At the same time the flanges 38 on the slide 18 are brought to rest against the lugs 42 (as seen in Figs. 4, 5 and 6), and the curved ends 104 (Fig. 2) on the guide flanges 48 are brought to rest against the boss 54. This prevents the slide parts from overtravelling, which if allowed to occur would permit the aforesaid pins to fall out.

It is to be noted that the construction and arrangement of the pins 34 and 74, and their associated holes and depressions, enables the desired coupling and uncoupling operations to be effected simply by rectilinear movement of the parts 10 and 12 in one direction, since movement of the pins in the direction perpendicular thereto is effected automatically by the camming of the pins with respect to opposite ends of their retaining holes 36 and 72 at the termination of the pushing and pulling operations employed to connect and disconnect the two coupling parts.

It is pointed out, however, that the construction and arrangement by which this is made possible forms no part of the present invention but forms the subject matter of my co-pending application Serial No. 295,533 filed June 25, 1952, Patent 2,709,090. The present invention is directed upon the feature of the lever 82, which may be applied to other constructions of sliding type constructions as, for instance, to the construction disclosed in U. S. Patent No. 2,500,847 dated March 14, 1950.

Having thus described my invention what I claim as novel and wish to secure by Letters Patent is as follows:

In combination with a separable hose coupling having two coupling members with flat faces overlapping each other when coupled together, said members have registrable openings defined therein for the passage of fluid, a slidable valve member disposed in each coupling member and adapted to be moved into closed position when said coupling members are separated, each coupling member having means connected with the valve member of the other coupling member for automatically moving said valve members as a unit to open and close their respective said openings incidental to connecting and disconnecting said coupling members by rectilinear pushing together and pulling apart movements of the coupling members with said flat faces engaged and sealed, of manual actuator lever and locking means for releasably locking said coupling members in connected condition and for applying a rectilinear force to the united valve members upon actuation of said means to release the coupling members for disconnection, said lever and locking means having a pivotal mounting with one of said members, interlocking means on said lever and locking means and said other member for engagement upon pivotal movement of said lever and locking means in one direction to lock said coupling members in coupled position, said lever and locking means having cam structure, spaced from said pivotal mounting and engageable with the valve member of the coupling member upon which said lever and locking means is mounted, upon pivotal movement of said lever and locking means in the opposite direction, to effect relative movement of said united valve members relative to said coupling members to close said openings.

References Cited in the file of this patent

UNITED STATES PATENTS

| | | |
|---|---|---|
| 1,215,481 | Cantin | Feb. 13, 1917 |
| 1,365,776 | Elmen | Jan. 18, 1921 |
| 2,478,586 | Krapp | Aug. 9, 1949 |
| 2,500,847 | McKay | Mar. 14, 1950 |